United States Patent [19]

Hayward et al.

[11] Patent Number: 4,984,470
[45] Date of Patent: Jan. 15, 1991

[54] VORTEX-SHEDDING FLOWMETERS

[76] Inventors: Alan T. J. Hayward, 6 Woodside Gardens, Portishead, Bristol, Great Britain, BS20 8EQ; Terence Cousins, 15 Pealsham Gardens, Fordingbridge, Hampshire, Great Britain, SP6 1AA

[21] Appl. No.: 375,017
[22] PCT Filed: Dec. 2, 1987
[86] PCT No.: PCT/GB87/00866
 § 371 Date: Aug. 7, 1989
 § 102(e) Date: Aug. 7, 1989
[87] PCT Pub. No.: WO88/04410
 PCT Pub. Date: Jun. 16, 1988

[30] Foreign Application Priority Data

Dec. 2, 1986 [GB] United Kingdom ............... 8628747

[51] Int. Cl.⁵ ........................................... G01F 1/32
[52] U.S. Cl. ............................................. 73/861.22
[58] Field of Search ............ 73/861.22, 861.23, 861.24

[56] References Cited

U.S. PATENT DOCUMENTS

| Re. 31,217 | 4/1983 | Rodely | 73/861.22 |
| 3,927,564 | 12/1975 | Ketelsen | 73/861.22 |
| 3,972,232 | 8/1976 | Miller et al. | 73/861.24 |
| 4,455,877 | 6/1984 | Blechinger et al. | |
| 4,584,883 | 4/1986 | Miyoshi et al. | 73/861.24 |

FOREIGN PATENT DOCUMENTS

| 2802009 | 7/1979 | Fed. Rep. of Germany . | |
| 0050262 | 4/1977 | Japan | 73/861.22 |
| 1502260 | 3/1978 | United Kingdom . | |
| 2042728 | 9/1980 | United Kingdom . | |
| 2102953 | 2/1983 | United Kingdom | 73/861.22 |
| 2128325 | 4/1984 | United Kingdom | 73/861.22 |
| 2132351 | 7/1984 | United Kingdom . | |

Primary Examiner—Herbert Goldstein
Attorney, Agent, or Firm—Bachman & LaPointe

[57] ABSTRACT

A vortex-shedding flowmeter including an annular or ring-shaped vortex-generating bluff body including providing a barrier which at least delays mutual interference between the two streams of vortices generated respectively at the inside and outside surfaces of the bluff body. This may provide either a solid barrier or alternatively a fluid barrier in the form of a stagnation zone between the bluff body and a further ring downstream of it.

28 Claims, 7 Drawing Sheets

VARIATION OF LINEARITY (DOWN TO $2\times10^4$) WITH L/d

VORTEX-SHEDDING FLOWMETERS

This invention relates to vortex-shedding flowmeters.

A vortex-shedding flowmeter consists essentially of two components: a "bluff body", the function of which is to generate a double stream of Karman vortices in the flowing fluid and an electrical device for detecting those vortices and transmitting an electric pulse to an electronic counter every time it senses the passage of a vortex. Ideally, the rate of emission of vortices and hence of electric pulses is directly proportional to the fluid flowrate past the bluff body. The extent to which this ideal is attained is known as the "linearity" of the flowmeter.

In conventional commercially-available vortex-shedding flowmeters, the bluff body takes the form of a metal bar extending diametrally across the pipe. These are generally made with a "blockage ratio"—i.e. the fraction of the cross-sectional area of the pipe that is obstructed by the bluff body—of around 30 to 40 percent. This results in a rather high pressure loss, which is disadvantageous, but attempts to construct such meters with substantially lower blockage ratios have not been successful, because their performance deteriorates when the blockage ratio is reduced.

Another disadvantage of such meters is that the flow past the bluff body is not axi-symmetric. This causes flow instabilities which result in irregular shedding of vortices. Measurements with several conventional meters have shown that the intervals between successive pulses vary so widely that their standard deviation is generally at least 10 percent of their mean value. This results in the rather poor repeatability which is characteristic of such meters.

Attempts have been made to overcome these disadvantages of the bar-shaped bluff body by using a ring-shaped bluff body, which it was thought would preserve the axi-symmetric nature of the flow past it, when installed co-axially in a pipe, and several patent applications for such meters were filed. But the ring-shaped bluff body was found not to give the performance that had been hoped for, and it is therefore still not utilised in practical meters.

With a ring-shaped bluff body, vortices are shed alternately from the inside and outside surfaces of the ring, thereby forming two streams. The essence of the invention is the discovery that the performance of a bluff body in the form of a vortex-shedding ring can be greatly improved if steps are taken to keep these two streams of vortices separate during the early stages of their formation, thus preventing them from mutual interference. This separation is accomplished according to the invention by providing a physical barrier between the two vortex streams. This barrier may be solid or it may be a fluid barrier, as will be explained hereinafter.

According to the invention we therefore provide a vortex-shedding flowmeter including an annular or ring-shaped vortex-generating bluff body, characterised by means to provide a barrier which at least delays mutual interference between the two streams of vortices generated respectively at the inside and outside surfaces of the bluff body.

The said means may provide either a solid or a fluid barrier.

In the case of a solid barrier the means preferably comprises a tubular or ring-shaped vortex separator so arranged that it keeps the two vortex streams physically separate. A fluid barrier, on the other hand, is preferably provided by a second ring downstream of the bluff body and coaxial with it. A stagnation zone in the flowing fluid forms between the two rings and if the relative inside and outside diameters of the two rings and the spacing between them are correctly chosen, this stagnation zone will lie between the two streams of vortices and act as a fluid barrier to keep them apart.

The ring-shaped bluff body is preferably circular when viewed in the direction of flow, so that its inside and outside circumferential surfaces are cylindrical, but it may be of other shapes, e.g. square, octagonal, hexagonal, or elliptical. Where a solid vortex separator is provided it is also preferably circular when viewed in the flow direction, but other shapes are likewise possible.

In the case of a solid vortex separator, each of the inner and outer annular surfaces of the bluff body may meet the corresponding surface of the vortex separator at a clearly defined edge or shoulder. In such a case the inner and outer surfaces of the bluff body may be cylindrical and the inner and outer surfaces of the vortex separator may for example be cylindrical or tapered.

On the other hand, there need not necessarily be a clearly defined edge or shoulder between the bluff body and the separator, but alternatively the separator may simply be a downstream extension of the bluff body with which it merges smoothly. In such a case the wall of the integral bluff body/separator may be of a wide variety of cross-sectional shapes, but all such shapes can be considered to be variations of three basic shapes, the rectangle, the triangle, and ellipse. A number of examples of specific shapes will be given hereinafter. In the case of a rectangle or modified rectangle, the ratio of the length of the integral bluff body/separator in the direction of flow (l) to the difference between its inside and outside radii (d) should be within the range 0.5 to 0.7. In the case of a triangle or modified triangle l/d should be 0.7 to 1.8.

The basic rectangular or triangular shapes may be modified in various ways, for example by hollowing them out between their upstream and downstream extremities (so that a triangle becomes a tee and a rectangle an H or a C) or by cutting away or chamfering edges downstream of the upstream face.

When a fluid barrier is provided by a second ring downstream of the first ring, the gap between the two rings is preferably from 0.2 d to 0.8 d (d being defined as hereinabove) (more preferably 0.4 d to 0.6 d).

In a particularly-preferred form of vortex-shedding flowmeter according to the invention incorporating a solid vortex-separator both the bluff body and the vortex separator are circular when sectioned in a plane perpendicular to the flow direction, wherein at the interface between the bluff body and the vortex separator the inner surface of the bluff body is of smaller diameter than the inner surface of the vortex separator and the outer surface of the bluff body is of greater diameter than the outer surface of the vortex separator, and wherein the inner and outer surfaces of the vortex separator meet respectively at clearly-defined shoulders. Each half of the cross-section of the bluff body and vortex separator taken as a whole is therefore generally tee-shaped with the vortex separator forming the vertical leg of the tee.

In this case, the vortex separator may be of constant cross-section, or may taper in the upstream or in the downstream direction. Further, the vortex separator may have an enlarged downstream end which has a smaller cross-sectional area than the bluff body.

Preferably, where the bluff body and vortex separators are coaxial, the difference between the inside diameters of the bluff body and the vortex separator is equal to the difference between the outside diameters of the bluff body and the vortex separator, but alternatively may be larger or smaller than the difference between the outside diameter of the bluff body and the vortex separator.

For integral bluff bodies/vortex separators with walls of tee-shaped cross section the l/d ratio is preferably within the range 0.7 to 1.8, as for triangular cross sections as mentioned hereinbefore. In fact, a tee-shape can be considered as a modified triangle.

In the case of a fluid barrier to interference between the two vortex streams provided by a second ring downstream of the ring-shaped bluff body, both rings can have a wide variety of wall shapes. For example, both rings may be relatively thin in the axial direction and of rectangular wall cross-section. Alternatively, the walls of either or both rings may be of tee-shaped cross section, and the or each tee cross-section ring can be arranged with the leg of the tee facing either upstream or downstream.

Further, the wall of the downstream ring may be of cruciform cross-section, with two legs of the cross parallel to the flow direction.

In all cases the shape of the or each ring may be modified in a variety of ways. For example the surface may be curved, and/or the edges or corners may be cut away or rounded.

In order to minimise disturbance to the vortices by the means whereby the bluff body and vortex separator are supported within the pipe, the bluff body and vortex separator are preferably supported by one or more fins of streamlined or aerofoil cross-section, and/or by one or more supporting legs which extend transverse to the pipe axis between the inside of the pipe and the bluff body and vortex separator at a position downstream of the vortex separator.

Any of the known means of vortex detection may be used, including electro-thermal detectors, electromechanical detectors, ultrasonic detectors, electromagnetic detectors, piezo-electric and fibre optic detectors. But the invention especially facilitates the use of devices which detect the alternations of differential pressure across the spearator that are associated with the shedding of vortices alternately from the inside and outside of the ring. This may be achieved in various ways, for example by installing one or more differential pressure detecting cells in the separator body, or by installing pressure tappings on either side of the separator body and connecting these via tubes or passages in the support(s) of the bluff body to a differential pressure cell mounted outside the pipe, to detect flow alternations arising from alternations in differential pressure. Alternatively, if a thin separator ring is used it will periodically expand and contract slightly as the internal and external vortices are shed and these movements may be detected by one or more strain gauges attached to the separator; such a gauge may conveniently take the form of an annular wire resistance gauge or optical fibre at or near the downstream end of the separator ring.

If a fluid barrier is used there may be a flexible solid member or members projecting into the fluid stagnation zone; these will oscillate in resmance with the passage of vortices and the oscillations may be detected electrically with strain gauges or other means.

The bluff body and its associated vortex separator are preferably in the form of cylinders with their axes parallel to the direction of the flow, since this will best preserve the axi-symmetrical nature of the flow past the ring.

The fins or legs linking the bluff body and vortex separator to the pipe wall should preferably be radial, and the preferred number of fins is three at 120° intervals, except that in the special case of what is known to those skilled in the art as an "insertion meter" a single fin may be more appropriate. The fins should preferably not themselves shed vortices of such an intensity as to interfere with the normal working of the flowmeter, and as mentioned above it is therefore preferred to make the fins of substantially streamlined or aerofoil cross-section.

Alternatively, as mentioned above, the bluff body and vortex separator may be supported by one or more angled brackets whose radial portions are sufficiently far downstream to ensure that any vortices they shed are unable to affect the operation of the meter.

When installed in a pipe to form a flowmeter the bluff body should preferably be co-axial with the pipe, except that in the special case of an "insertion meter" other positions may sometimes be preferable.

The "blockage ratio" (as defined herein) of a flowmeter according to this invention is preferably less than 20% and more preferably less than 10%. Flowmeters according to the invention preferably have a standard deviation of the intervals between successive pulses of not more than 5% and more preferably not more than 2.5%.

Embodiments of the invention will now be described in more detail and with reference to the accompanying drawings in which.

The same reference numerals are used for similar components in the various figures.

Figure 1A:
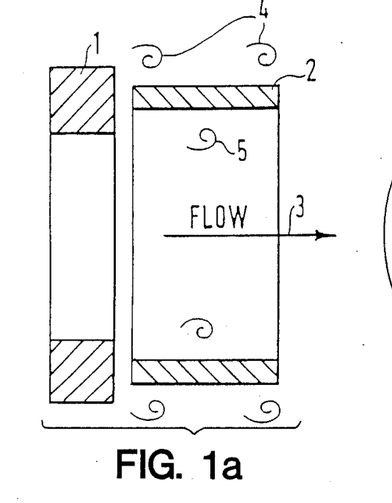
FIGS. 1a–1b shows, in longitudinal section and also in rear elevation, a bluff body with a separate associated vortex separator.
Figure 1B:
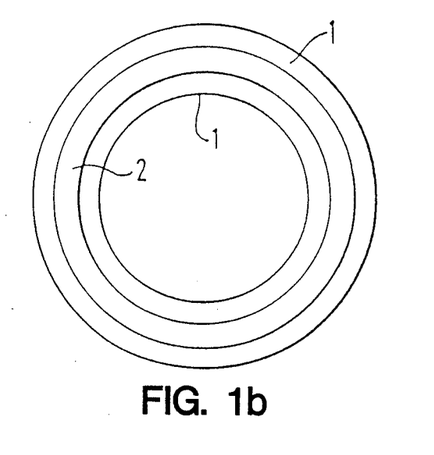

FIG. 1 shows a separate annular bluff body 1 and a cylindrial vortex separator 2 coaxial with it. When mounted in a pipe (now shown) of appropriate diameter, vortices will be created in fluid flowing along the pipe in the direction of the arrow 3. One stream of vortices 4 is formed at the outside surface of the bluff body 1, and a second stream 5 at the inside surface.

Figure 2:
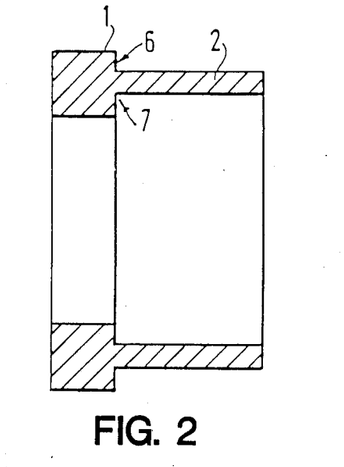
FIGS. 2 and 3 show in longitudinal section bluff bodies with integral vortex separators.
Figure 3:
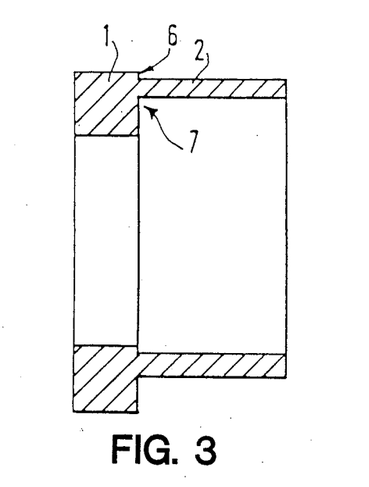

FIGS. 2 and 3 show alternative embodiments in which the bluff body 1 and the vortex separator 2 are integral.

In both cases, the bluff body and the separator meet at distinct outer and inner shoulders 6,7. In the arrangement shown in FIG. 2, the two shoulders 6,7 are of equal height, whereas, in FIG. 3, shoulder 7 is substantially higher than shoulder 6.

Figure 4:
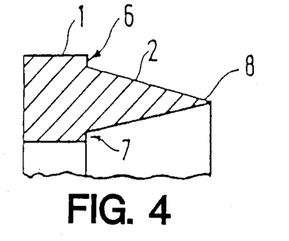
FIGS. 4 to 11 shows in partial longitudinal section alternative bluff bodies with integral vortex separators.

FIG. 4 shows an arrangement in which the separator 2 tapers from shoulders 6,7, where it meets the bluff body 1, to an annular edge 8 at its distal end.

Figure 5:
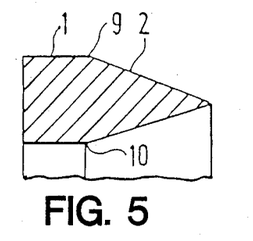
Figure 6:
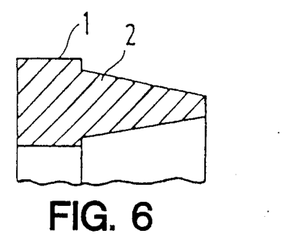
Figure 7:
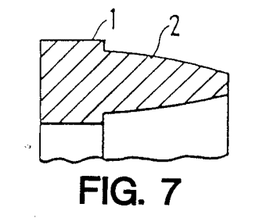
Figure 8:
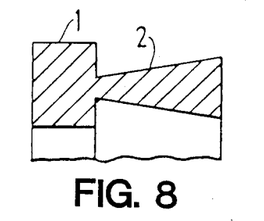
Figure 9:
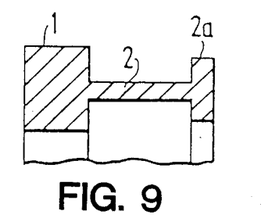

FIG. 5 shows a variant in which the bluff body 1 and separator 2 meet at edges 9,10 instead of shoulders.

FIGS. 6, 7, 8, and 9 show further variants all with tapering separators 2.

Figure 10:
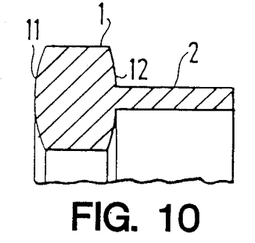

FIG. 10 shows a variant with convexly-curved front and rear surfaces 11,12 on the bluff body 1.

In a variant of this, the convex front face of the bluff body may consist of two flat surface portions at a slight angle to one another and meeting at an edge.

Figure 11:
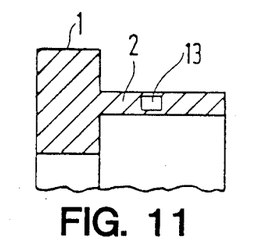

FIG. 11 shows a bluff body 1 and an integral separator 2 in which the separator 2 incorporates a differential pressure transducer 13 for detecting the passage of vortices.

Figure 12:
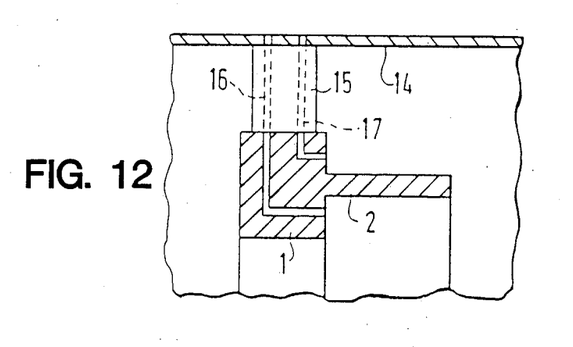
FIG. 12 shows in partial longitudinal section a bluff body and means for connecting it to a differential pressure cell.

FIG. 12 shows a bluff body 1 and integral separator 2 which is mounted on the inside wall of a pipe 14 by an aerofoil-shaped fin 15. The fin 15 and the bluff body 1 incorporate tappings 16, 17 to enable the pressure of the inside and outside rear surfaces of the bluff body to be sensed. These tappings are connected to a differential pressure cell or an anemometer (not shown) mounted outside the pipe.

Figure 13:
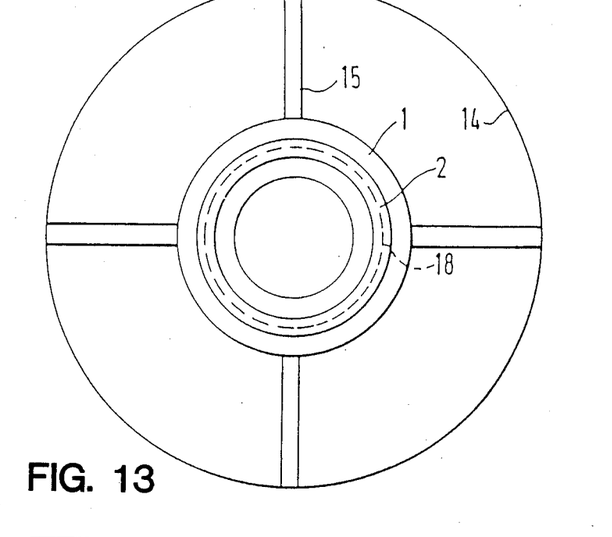
FIG. 13 shows, in end elevation, a bluff body and vortex separator incorporating a strain gauge for detecting vortices.

FIG. 13 shows a bluff body 1 and a vortex separator 2 incorporating an annular strain gauge 18 on the downstream end surface of the separator 2, for detecting the passage of vortices.

Figure 14:
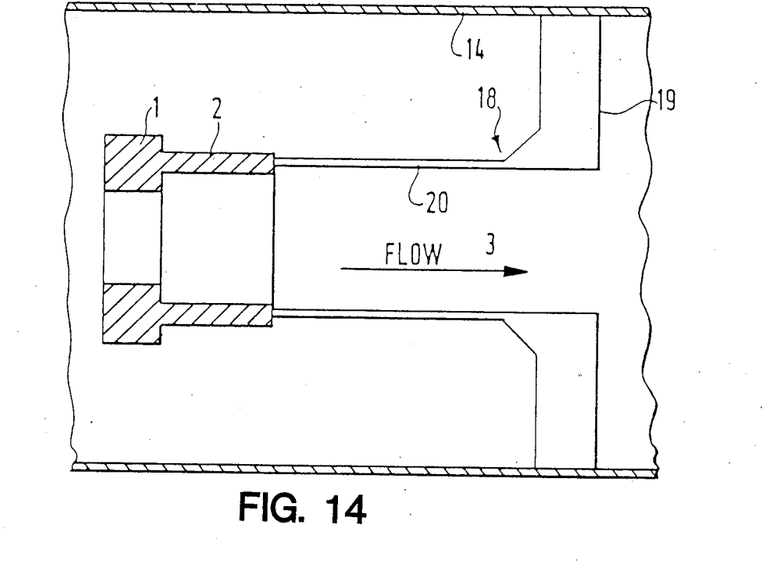
FIG. 14 shows a bluff body and vortex separator mounted on the inside of a pipe.
Figure 15:
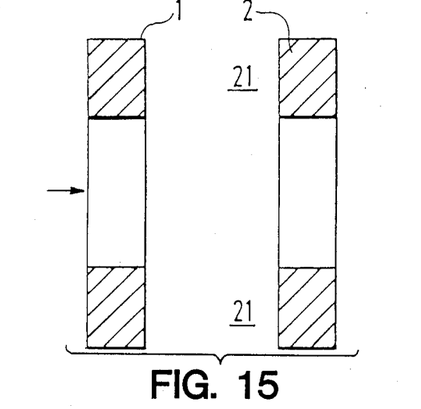
FIGS. 15 to 18 show, in cross-section, various combinations of vortex-shedding bluff body and separate downstream ring to provide a fluid barrier to interference between the two streams of vortices.
Figure 16:
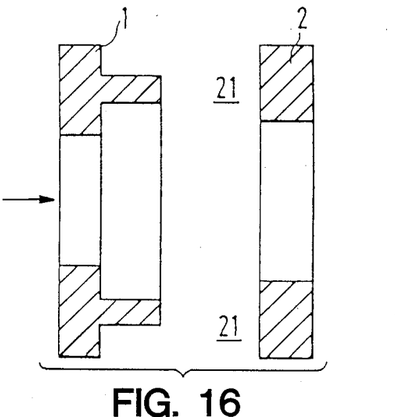
Figure 17:
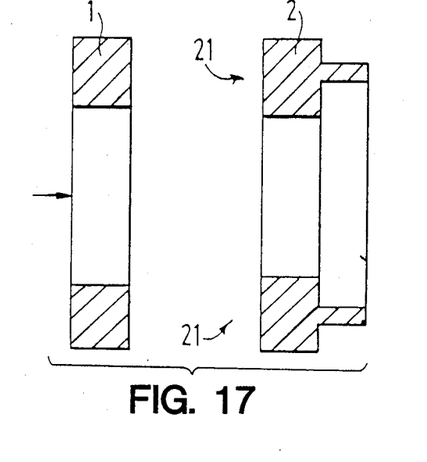
Figure 18:
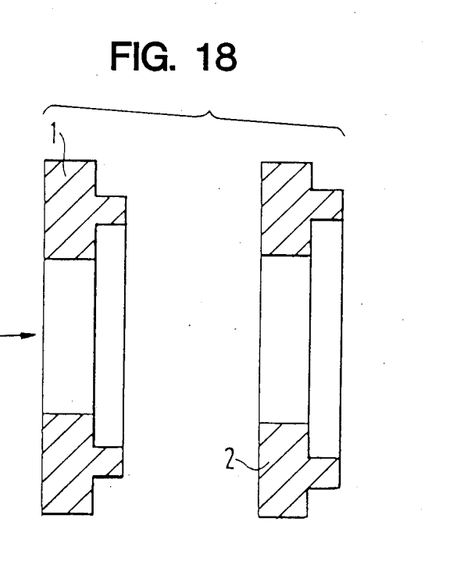

FIG. 14 shows a bluff body 1 and integral vortex separator 2 which are supported within pipe 14 by angled supports 18 (of which there may be only one or more than the two shown) each of which comprise a radial portion 19 and an axial portion 20, with the radial portions downstream of the separator 2, so that any vortices created by it do not disturb the functioning of the flowmeter.

Three prototypes of a bluff body and integral vortex separator as shown in FIG. 2 have been tested in a wind tunnel of 305 mm interval diameter, all with three-fin aerofoil supports and hot-wire vortex detectors. The best of these had a vortex-shedding ring with an outside diameter of 122 mm, and inside diameter of 87 mm and a length of 12 mm, together with a separator ring of outside diameter 110 mm, and inside diameter of 100 mm and a length of 20 mm.

The blockage ratio of this meter was less than 10 percent and the pressure drop caused by it was very much less than half that caused by conventional vortex-shedding meters, which customarily have blockage ratios in the region of 30 to 40 percent.

This meter was found to have a more regular pattern of pulse emission than any conventional meter. The standard deviation of the intervals between successive pulses was 2.5 percent, compared with more than 10 percent for the conventional meter tested under comparable conditions at the same time.

This prototype was also found to have about twice the signal strength and about twice the signal-to-noise ratio of a conventional meter tested under comparable conditions at the same time.

The linearity of the prototype was comparable with that of conventional meters; that is to say, it wa approaching 0.5 percent over the range of Reynolds numbers (based on wind tunnel diameter) from 60,000 to 260,000.

FIGS. 15 to 18 show, respectively, four different arrangements of bluff body 1 and separator ring 2, where the separator ring is spaced from the bluff body so that a fluid barrier keeping the two streams of vortices shed by the inner and outer edges of the bluff body is formed in a stagnation zone 21 upstream of the front face of the ring 2.

Figure 19A:
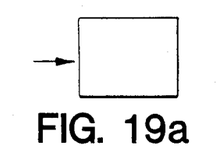
FIGS. 19a-l shows wall cross-sections of a variety of other rings which can be used either for the bluff body, or for a second downstream ring providing a fluid barrier to interference between the two streams of vortices, or both.
Figure 19B:
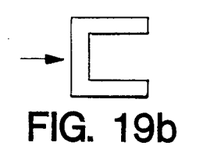
Figure 19C:
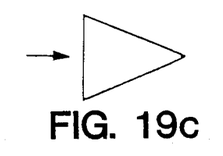
Figure 19D:
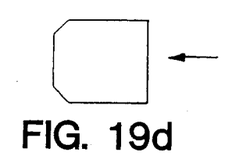
Figure 19E:
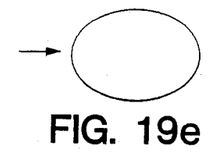
Figure 19F:
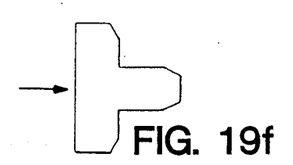
Figure 19G:
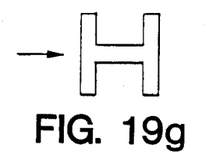
Figure 19H:
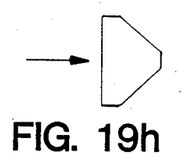
Figure 19I:
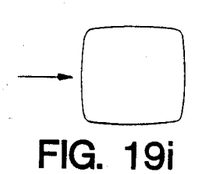
Figure 19J:
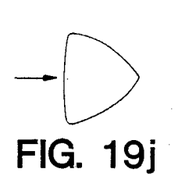
Figure 19K:
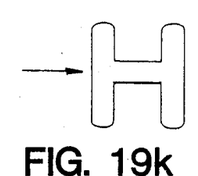
Figure 19L:
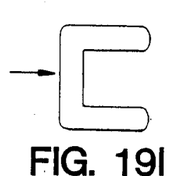

A bluff body of triangular or modified triangular wall cross-section (as shown in FIG. 19c and 19h respectively) may be considered to be equivalent to the rings of tee-shaped wall cross section shown in FIGS. 15 to 18 and may therefore replace rings of the tee-shaped wall cross-sections shown in those figures.

FIG. 19 shows a variety of further alternative wall cross-section shapes that may be employed instead of the cross-sections shown in FIGS. 15 to 18. In each case the arrow shows the flow direction. FIGS. 19d, f, and h show how the basic rectangular, tee-shaped, and triangular wall cross-sections, can be modified by cutting away or chamfering edges, especially downstream of the upstream face of the ring, and FIGS. 19i,j,k, and l, show modifications achieved by the rounding of surfaces.

Figures 20, 21:
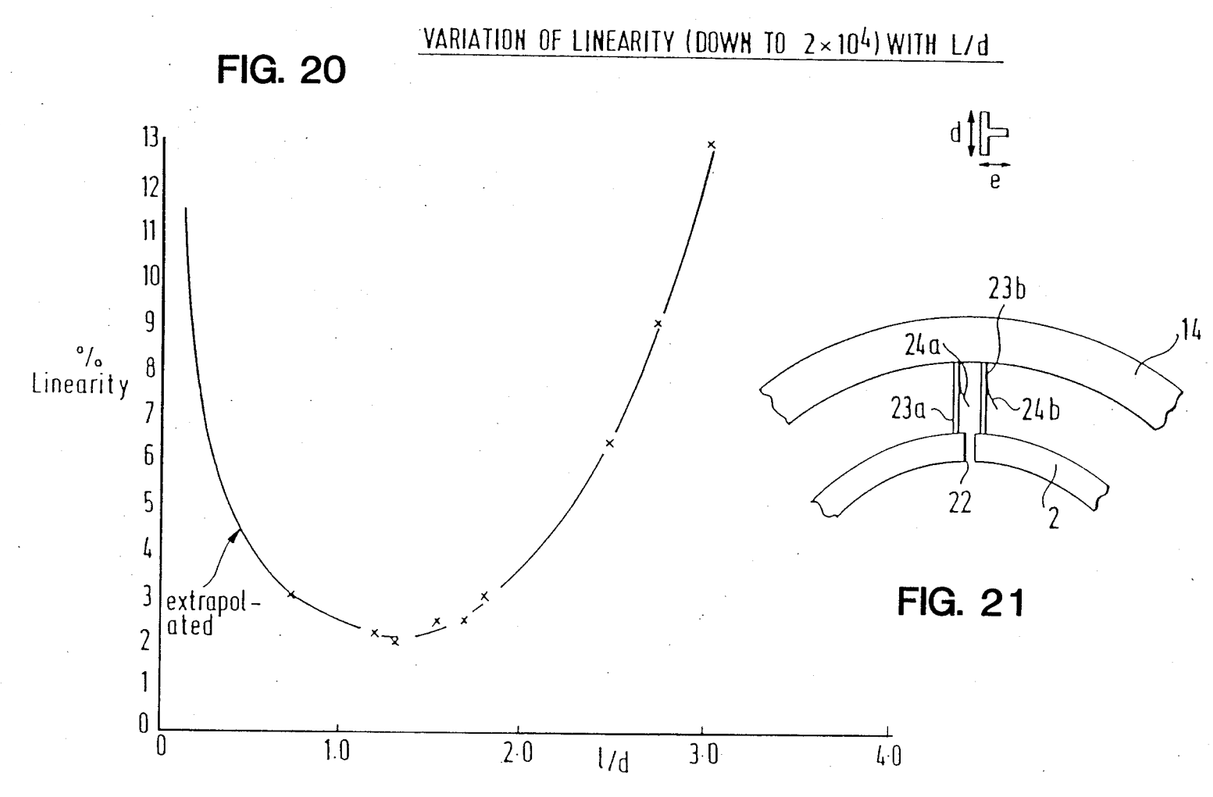
FIG. 20 is a graph showing the effect on the linearity of the meter of varying l/d for a tee-shaped integral bluff body and separator ring.
FIG. 21 shows in schematic rear elevation a portion of a tee-shaped integral bluff body and separator ring showing strain gauges for detecting the passage of vortices.

FIG. 20 is a graph showing the deviation from linearity (in %) plotted against the l/d ratio (as explained hereinbefore) for an integral bluff body/vortex separator of tee-shaped wall cross-section. It shows that optimum linearity is obtained at an ratio of about 1.3, although ratios in the range 0.7 to 1.8 are acceptable in practice.

FIG. 21 shows an alternative means of detecting vortices by means of strain gauges. It is a rear elevation showing part of the vortex separator 2 within a pipe 14. The vortex separator has a very narrow axial split 22, the bluff body (not shown) may or may not also have a corresponding split. A pair of closely spaced cantilevered parallel supporting legs 23a, 23b, extends from the pipe wall to the vortex separator 2 so that they meet the separator 2 on opposite sides of the split 22. Two strain gauges 24a, 24b are mounted respectively on the legs 23a, 23b. The strain gauges are connected separately to signal processing means (not shown) outside the pipe.

In use, when a vortex passes up the inside of the vortex separator 2, the pressure inside the separator falls below that in the remainder of the pipe so that the gap 22 is closed. On the other hand, when a vortex passes along the outside of the separator 2, the pressure outside the pipe falls below that inside the pipe so that the gap 22 is opened. In the first case the legs 23a, 23b tend to be deflected towards one another, and in the second case they tend to be deflected away from one another. Thus, the two legs will be deflected in opposite directions and at any given moment their associated strain gauges will generate opposite signals. Over a period of time, each strain gauge will record a sine wave signal and the signals from the two gauges will be 180° out of phase. By the use of known signal processing techniques, one waveform can be shifted 180° relative to the other so that the two waveforms will be in phase and if added together will give a single amplified signal.

Known vortex shedding flowmeters are subject to vibration and vibration tends to give rise to signals which resemble those produced by the passage of Karman vortices. Thus, vibration can mask the signals produced by the vortices and reduce the sensity of the meter. The above signal-detecting means at least partially solves the problems caused by vibration. If the pipe 14 vibrates, the resulting vibrational movements of the bluff body/vortex separator tend to lag behind those of the pipe and thus the bluff body/vortex separator assembly tends to move bodily back and forth relative to the pipe 14. This will cause the two legs 23a, 23b to be deflected in the same direction (as shown in FIG. 21). Thus, prior to processing, the signals from the two associated strain gauges will be in phase. However, after processing to shift one signal 180° relative to the other, the two signals will be 180° out of phase and when added together will at least substantially cancel out. As a result, there will be no question of vibration masking the passage of vortices with this vortex detection means.

The vortex separator 2 may be suspended by more than one pair of legs 23a, 23b. For example, three pairs may be spaced around its circumference 120° apart. Strain gauges and the associated signal processing means as described above may be associated with two or more of such pairs of legs. If three sets of strain gauses and signal processing means is provided, for example, the three resulting sets of signals can be compared electronically and signals from a faulty set of strain gauges discarded.

We claim:

1. A vortex-shedding flowmeter which comprises an annular or ring-shaped vortex-generating bluff body having inside and outside surfaces which generates two streams of vortices at said surfaces respectively, and a means downstream of the bluff body to provide a barrier between the two streams of vortices which at least delays mutual interference between them.

2. A vortex-shedding flowmeter according to claim 1 in which the ring-shaped bluff body is circular when viewed in the direction of flow.

3. A vortex-shedding flowmeter according to claim 2 wherein the inside and outside surfaces of the bluff body are cylindrical.

4. A vortex-shedding flowmeter according to claim 1, wherein the said means is a solid barrier in the form of a tubular or ring-shaped vortex separator extending downstream of the bluff body.

5. A vortex-shedding flowmeter according to claim 4, wherein the vortex separator is circular when viewed in the flow direction.

6. A vortex-shedding flowmeter according to claim 5 wherein each of the inner and outer circumferential surfaces of the bluff body meets the corresponding surface of the vortex separator at a clearly defined edge or shoulder.

7. A vortex-shedding flowmeter according to claim 5 wherein the vortex separator is formed as a downstream smooth continuation of the bluff body, so that the integral bluff body/separator has a triangular wall cross-section with the ratio of the length (l) in the flow direction to the difference between the inside and outside maximum radii of the integral bluff body/separator (d) of 0.7 to 1.8, or rectangular wall cross-section where l/d=0.5 to 0.7.

8. A vortex-shedding flowmeter according to claim 4, wherein the bluff body and the vortex separator are integral.

9. A vortex-shedding flowmeter according to claim 8 wherein the inner and outer surfaces of both the bluff body and the vortex separator are circular when sectioned in a plane at right angles to flow direction, wherein at the interface between the bluff body and the vortex separator the inner surface of the bluff body is of smaller diameter than the inner surface of the vortex separator and the outer surface of the bluff body is of greater diameter than the outer surface of the vortex separator, and wherein the inner and outer surfaces of the bluff body and the inner and outer surfaces of the vortex separator meet respectively at clearly-defined shoulders.

10. A vortex-shedding flowmeter according to claim 9, wherein the bluff body and the vortex separator are coaxial.

11. A vortex-shedding flowmeter according to claim 9, wherein the vortex separator is of constant cross-section, or tapers in the upstream or the downstream direction.

12. A vortex-shedding flowmeter according to claim 1, wherein the bluff body and means to provide a barrier are provided with one or more fins of streamlined or aerofoil cross-section to enable them to be supported within a pipe.

13. A vortex-shedding flowmeter according to claim 1, wherein the bluff body and means to provide a barrier are provided with one or more supporting legs to extend between the inside of a pipe within which the bluff body and solid means are to be mounted and the bluff body and vortex separator at a position downstream of the vortex separator.

14. A vortex-shedding flowmeter according to claim 1, including one or more electro-thermal detectors, electro-mechanical detectors, piezo-electric means, fibre optic detectors, ultrasonic detectors and electric-magnetic detectors for detecting the passage of vortices.

15. A vortex-shedding flowmeter according to claim 14, including at least one differential pressure detector for detecting periodic differences in fluid pressure between the inside and outside surfaces of the means to provide a barrier associated with the passage of alternating vortices along said surfaces, wherein the differential pressure detectors are mounted on the means to provide a barrier.

16. A vortex-shedding flowmeter according to claim 1, including at least one differential pressure detector for detecting periodic differences in fluid pressure between the inside and outside surfaces of the means to provide a barrier associated with the passage of alternating vortices along said surfaces.

17. A vortex-shedding flowmeter according to claim 16 wherein said differential pressure detector is mounted outside the pipe and is connected to pressure tapping on the said inside and outside surfaces.

18. A vortex-shedding flowmeter according to claim 1, including at least one strain gauge on the means to provide a barrier to detect periodic deformations of the said means caused by passage of vortices.

19. A vortex-shedding flowmeter according to claim 18 having a blockage ratio of less than 10%.

20. A vortex-shedding flowmeter according to claim 19, in which the strain gauge detects the passage of vortices and generates an electrical pulse at the passing of each of the vortices, the intervals between which are measured, and the standard deviation of said intervals is not more than 2.5% of their mean value.

21. A vortex-shedding flowmeter according to claim 18, wherein the means to provide a barrier is split in the axial direction, a pair of spaced and parallel supporting legs extend between the pipe wall and the said means on opposite sides of the split, and a strain gauge is mounted on each of said legs to detect deformation thereof.

22. A vortex-shedding flowmeter according to claim 1, having a blockage ratio of less than 20%.

23. A vortex-shedding flowmeter according to claim 1, in which the vortices passing said means downstream are detected by a pressure detector, which generates an electrical pulse at the passing of each of the vortices, the intervals between which are measured, and the standard deviation of said intervals is not more than 5% of their mean value.

24. A vortex-shedding flowmeter which comprises an annular or ring-shaped vortex-generating bluff body having inside and outside surfaces which generates two streams of vortices at said surfaces respectively, and a vortex separator ring, also having inside and outside surfaces, located downstream of the bluff body and spaced from it such that a stagnation zone forms between the bluff body and the downstream ring to act as a barrier to mutual interference between the two stream of vortices.

25. A vortex-shedding flowmeter according to claim 24, wherein the spacing between the bluff body and the downstream ring is 0.2 d to 0.6 d.

26. A vortex-shedding flowmeter according to claim 25, wherein the spacing between the bluff body and the downstream ring is 0.4 d to 0.6 d.

27. A vortex-shedding flowmeter according to claim 24, wherein the wall cross-section of at least one of the bluff body and downstream separator ring is tee-shaped.

28. A vortex-shedding flowmeter according to claim 24, wherein the vortex separator is circular when viewed in the flow direction.

* * * * *